US012617539B2

(12) United States Patent　　　　　　(10) Patent No.:　US 12,617,539 B2
Gharagozloo et al.　　　　　　　　　　(45) Date of Patent:　　　　May 5, 2026

(54) METHOD AND SYSTEM FOR MITIGATING AN ELECTRIC MOTOR FAULT IN AN AIRCRAFT POWER PLANT

(71) Applicant: PRATT & WHITNEY CANADA CORP., Longueuil (CA)

(72) Inventors: Alireza Gharagozloo, Boucherville (CA); Michael Hanna, Beaconsfield (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 48 days.

(21) Appl. No.: 18/213,483

(22) Filed: Jun. 23, 2023

(65)　　　　　Prior Publication Data

US 2024/0425187 A1　　Dec. 26, 2024

(51) Int. Cl.
　　B64D 27/33　　　(2024.01)
　　B64D 27/10　　　(2006.01)
　　B64D 27/24　　　(2006.01)
　　B64D 31/04　　　(2006.01)
　　B64D 31/09　　　(2024.01)
　　B64D 31/10　　　(2006.01)
　　B64D 27/02　　　(2006.01)

(52) U.S. Cl.
　　CPC ............. B64D 31/10 (2013.01); B64D 27/10 (2013.01); B64D 27/24 (2013.01); B64D 27/33 (2024.01); B64D 31/04 (2013.01); B64D 31/09 (2024.01); *B64D 27/026* (2024.01)

(58) Field of Classification Search
　　CPC ...... B64D 27/026; B64D 31/04; B64D 31/06; B64D 31/10; B64D 27/10; B64D 27/24; B64D 27/33; B64D 27/34
　　See application file for complete search history.

(56)　　　　　References Cited

U.S. PATENT DOCUMENTS

| 11,560,237 | B2 | 1/2023 | Zoppitelli et al. | |
| 2015/0252740 | A1* | 9/2015 | Heyl | F02D 41/222 |
| | | | | 701/101 |
| 2018/0194483 | A1* | 7/2018 | Schwöller | B64D 31/04 |
| 2020/0277064 | A1 | 9/2020 | Thomassin et al. | |

(Continued)

FOREIGN PATENT DOCUMENTS

EP　　　　　2404775　B1　　10/2014

OTHER PUBLICATIONS https://web.archive.org/web/20220716020134/https://www.togasim.com/mu2docs/systems_descriptions/engine_prop/engine_prop.html; Toga; 2022.*

(Continued)

*Primary Examiner* — Rodolphe Andre Chabreyrie

(74) *Attorney, Agent, or Firm* — Norton Rose Fulbright Canada LLP

(57)　　　　　　ABSTRACT

Methods and systems for operating an aircraft power plant including an electric motor configured to propel an aircraft are provided. The methods and systems are used to mitigate a fault associated with the electric motor. The method includes receiving a power request from a power lever of the aircraft and using a controller to control the electric motor according to the power request. After a fault associated with the electric motor has been detected, the method includes receiving a deactivation request from the power lever. After receiving the deactivation request, the electric motor is deactivated independently of the controller.

15 Claims, 9 Drawing Sheets

(56)                    References Cited

U.S. PATENT DOCUMENTS

| 2021/0079855 | A1* | 3/2021 | Cervelli | ................ B64C 11/385 |
| 2021/0347490 | A1 | 11/2021 | Landers et al. | |
| 2022/0009615 | A1* | 1/2022 | Mark | ................... B64D 35/023 |
| 2022/0234748 | A1 | 7/2022 | Mark et al. | |
| 2023/0002034 | A1 | 1/2023 | Clark | |

OTHER PUBLICATIONS

European Patent Office, Communication re. extended European search report for European Patent Application No. 24183554.5, Sep. 27, 2024.

\* cited by examiner

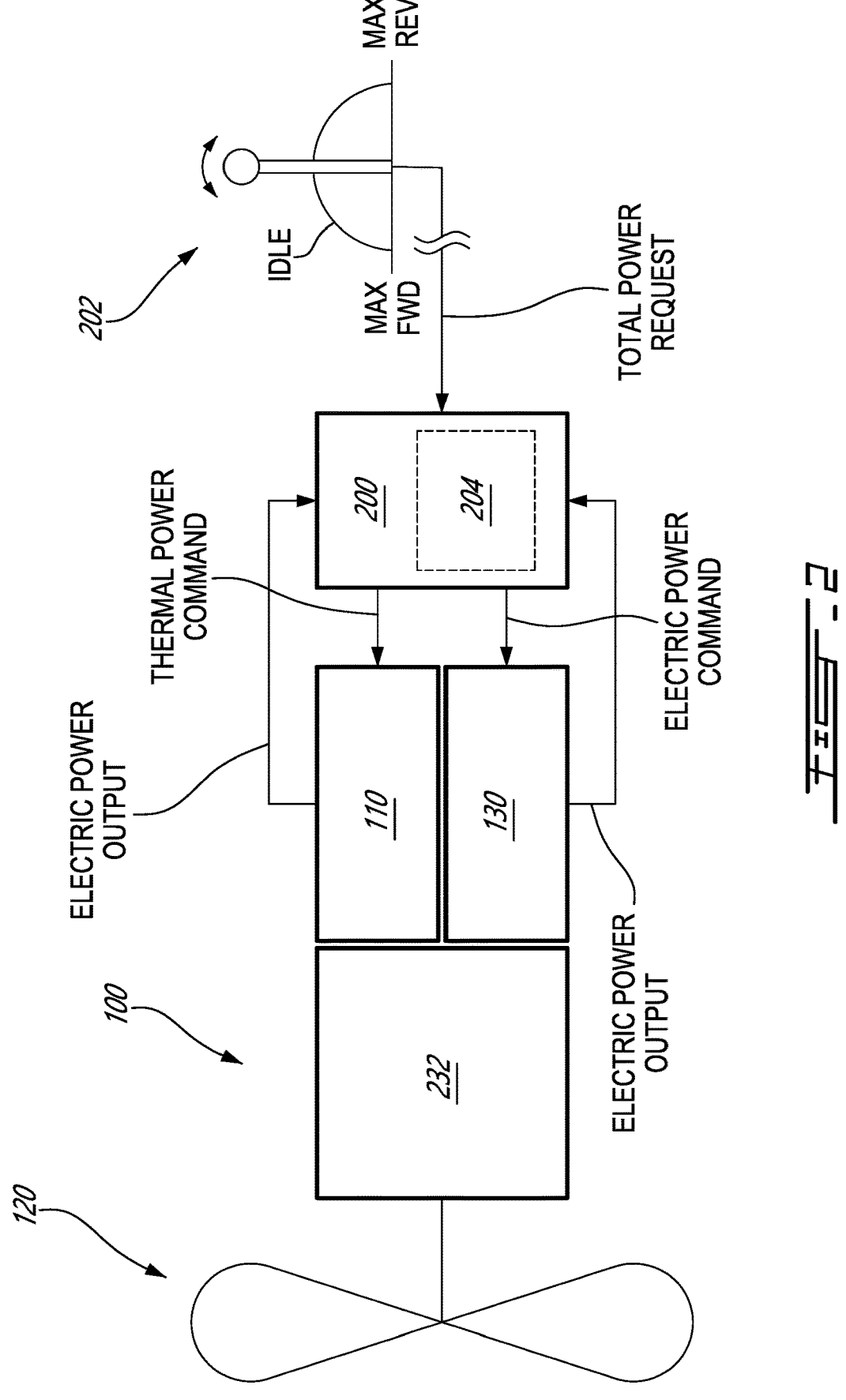
_FIG-2_

1002

Receive power request from power lever.

1004

Use a controller to control an electric motor according to the power request.

1006

After a fault associated with the electric motor has been detected, receive a deactivation request from the power lever.

1008

After receiving the deactivation request, deactivate the electric motor.

1000

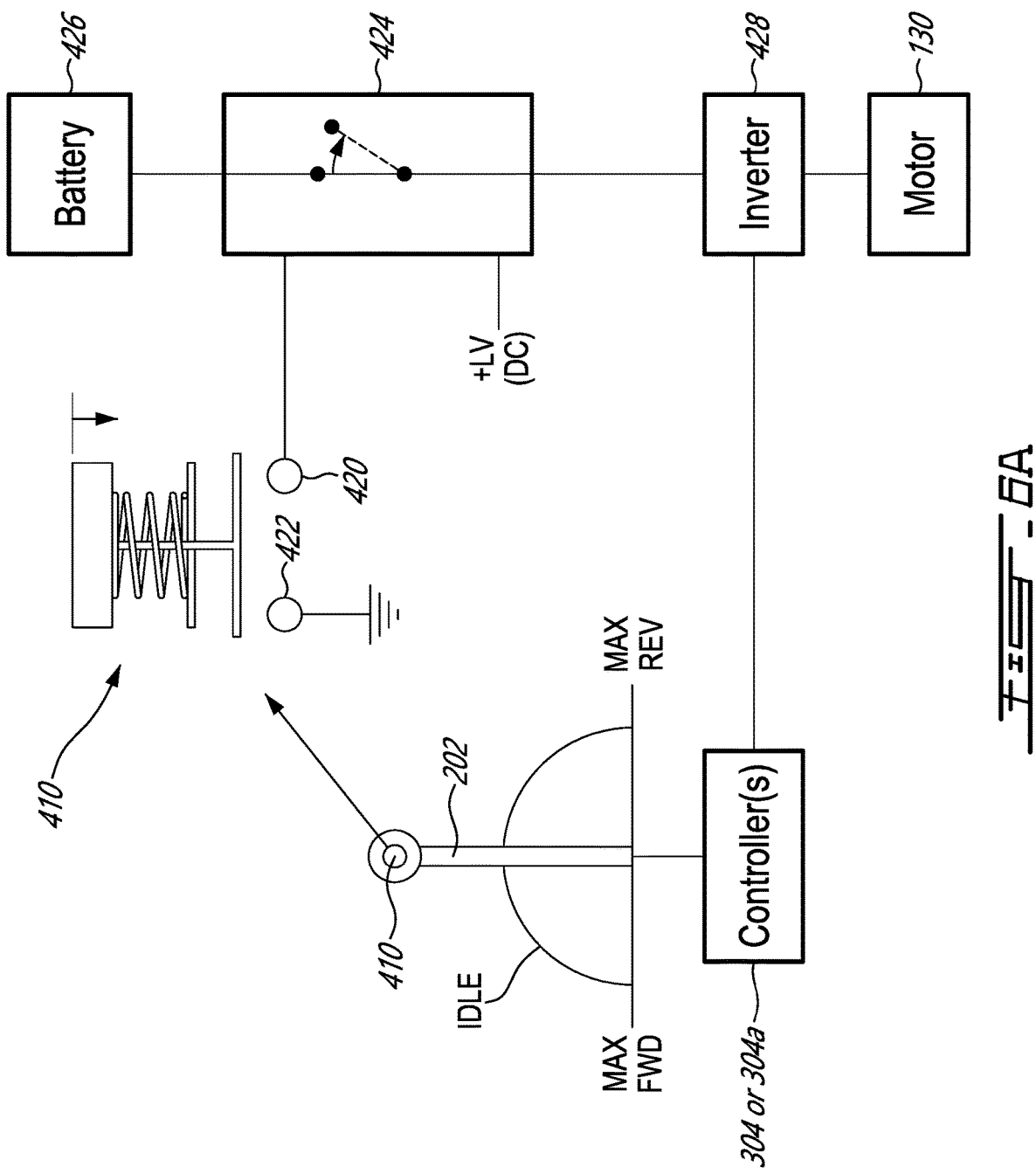
_FIG_-6A

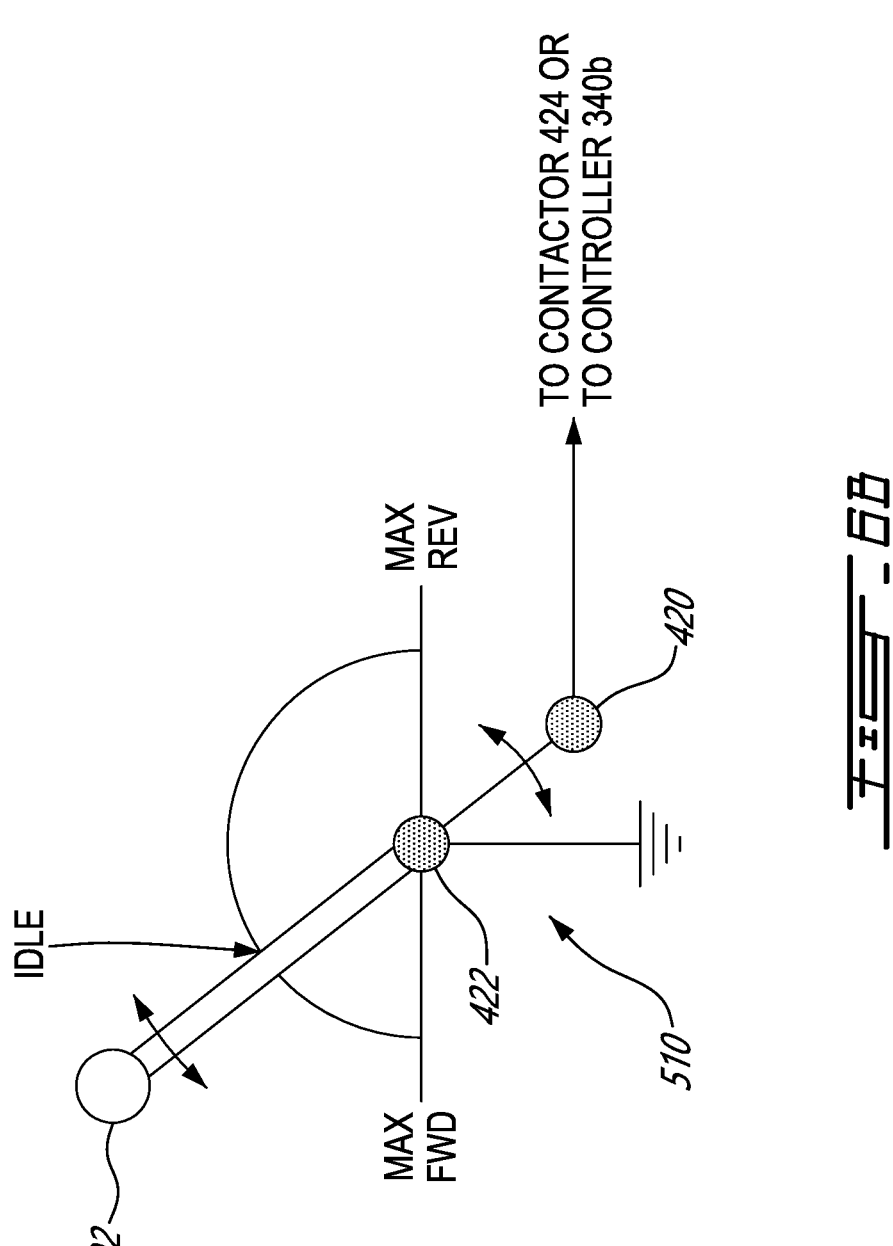
_FIG. 6B_

METHOD AND SYSTEM FOR MITIGATING AN ELECTRIC MOTOR FAULT IN AN AIRCRAFT POWER PLANT

TECHNICAL FIELD

The disclosure relates generally to aircraft power plants and, more particularly, to mitigating electric motor faults in aircraft power plants.

BACKGROUND

In an aircraft power plant including electric propulsion, electrical energy is converted to mechanical energy by an electric motor to drive an air mover, such as a fan or a propeller. In case of a fault associated with the electric motor, the electric motor could potentially enter into an over torque condition or an over speed condition, which could negatively affect the operation of the aircraft to which the power plant is mounted. Improvement is desired.

SUMMARY

In one aspect, the disclosure describes a method of operating an aircraft power plant including an electric motor configured to propel an aircraft. The method comprising:
  receiving a power request from a power lever of the aircraft;
  using a controller to control the electric motor according to the power request;
  after a fault associated with the electric motor has been detected, receiving a deactivation request from the power lever; and
  after receiving the deactivation request, deactivating the electric motor independently of the controller.

The method may include generating the deactivation request in response the power lever being moved to a prescribed power lever position.

The prescribed power lever position may be an idle position.

Generating the deactivation request may include actuating a switch from movement of the power lever to the prescribed power lever position.

The method may include generating the deactivation request in response to an actuation of a manual switch located on the power lever.

Disabling the electric motor may include disconnecting the electric motor from a power source configured to power the electric motor.

The controller may be a first controller for the electric motor. The method may include: receiving the deactivation request at a second controller for the electric motor; and using the second controller to deactivate the electric motor.

The deactivation request may be indicative of a request for zero output torque from the electric motor.

The method may include deactivating the electric motor via a communication path that excludes the controller.

The method may include: using a first communication path between the power lever and the electric motor to control the electric motor according to the power request, the first communication path including the controller; and using a second communication path between the power lever and the electric motor to deactivate the electric motor, the second communication path being separate from the first communication path.

The aircraft power plant may include a thermal engine configured to propel the aircraft. The method may include controlling the thermal engine according to the power request.

Embodiments may include combinations of the above features.

In another aspect, the disclosure describes a method of operating an aircraft power plant including an electric motor configured to propel an aircraft. The method comprises:
  receiving a power request from a power lever of the aircraft;
  controlling the electric motor according to the power request via a first communication path between the power lever and the electric motor;
  after a fault associated with the electric motor has been detected, receiving a deactivation request from the power lever; and
  deactivating the electric motor via a second communication path between the power lever and the electric motor, the second communication path being separate from the first communication path.

The first communication path may include a motor controller. The second communication path may exclude the motor controller.

The first communication path may include a first motor controller. The second communication path may include a second motor controller.

The power aircraft plant may include a thermal engine configured to propel the aircraft. The method may include controlling the thermal engine according to the power request.

Embodiments may include combinations of the above features.

In a further aspect, the disclosure describes a system for operating an aircraft power plant including an electric motor configured to propel an aircraft. The system comprises:
  a power lever configured to be actuated by a pilot of the aircraft to generate a power request corresponding to a position of the power lever;
  a controller operatively connected to the power lever and configured to control the electric motor according to the power request; and
  a switch disposed on said power lever or actuatable by the power lever, the switch being actuatable to generate a deactivation request to deactivate the electric motor independently of the electric motor.

The switch may be actuatable via a push button disposed on the power lever.

The switch may be actuatable by movement of the power lever to a prescribed lever position.

The system may include a contactor configured to disconnect the electric motor from a power source configured to power the electric motor. The switch may be operatively connected to the contactor via a communication path that excludes the controller.

The controller may be a first controller for the electric motor. The system may include a second controller for the electric motor configured to received the deactivation request and deactivate the electric motor.

Embodiments may include combinations of the above features.

Further details of these and other aspects of the subject matter of this application will be apparent from the detailed description included below and the drawings.

DESCRIPTION OF THE DRAWINGS

Reference is now made to the accompanying figures in which:

FIG. 2 is a schematic diagram of the hybrid electric power plant including a power management system;

FIG. 6A is a schematic diagram of an exemplary manual switch disposed on a power lever and incorporated into a fault mitigation system;

FIG. 6B is a schematic diagram of an exemplary switch actuatable by movement of the power lever to a prescribed position.

DETAILED DESCRIPTION

The present disclosure is directed to controlling electric motors, such as those used in aircraft propulsion systems. Systems and methods for operating aircraft power plants including one or more electric motor are described. In some embodiments, the systems and methods described herein may facilitate the mitigation of faults associated with such electric motors. In some embodiments, the systems and methods described herein may provide a separate (second) communication path for deactivating an electric motor after a fault is detected. The second communication path may be separate and independent from another (first) communication path that was being used to control the electric motor immediately before the fault occurred or was detected. The use of the second communication path may provide an independent means of deactivating the electric motor even in if the fault is caused by a failure in the first communication path.

Although the disclosure makes reference to a hybrid-electric power plant (HEP) with both a thermal engine and an electric motor for propelling an aircraft as a non-limiting example, the principles described herein may be similarly applied to aircraft power plants which include one or more electric motors for propelling the aircraft, without the presence of a thermal (e.g. combustion) engine.

With an HEP, power deviations from one power source may be mitigated by increasing or decreasing the power output from the other power source to accommodate the fault. Controlling the power output from an electric motor requires the use of electronic components. In the event of a fault associated with an electric motor, the electric motor may be deactivated or shut down as quickly as possible to limit the impact on the operation of the aircraft and/or limit damage that could occur to the electric motor and/or to associated (e.g., electronic) components.

Figure 1:
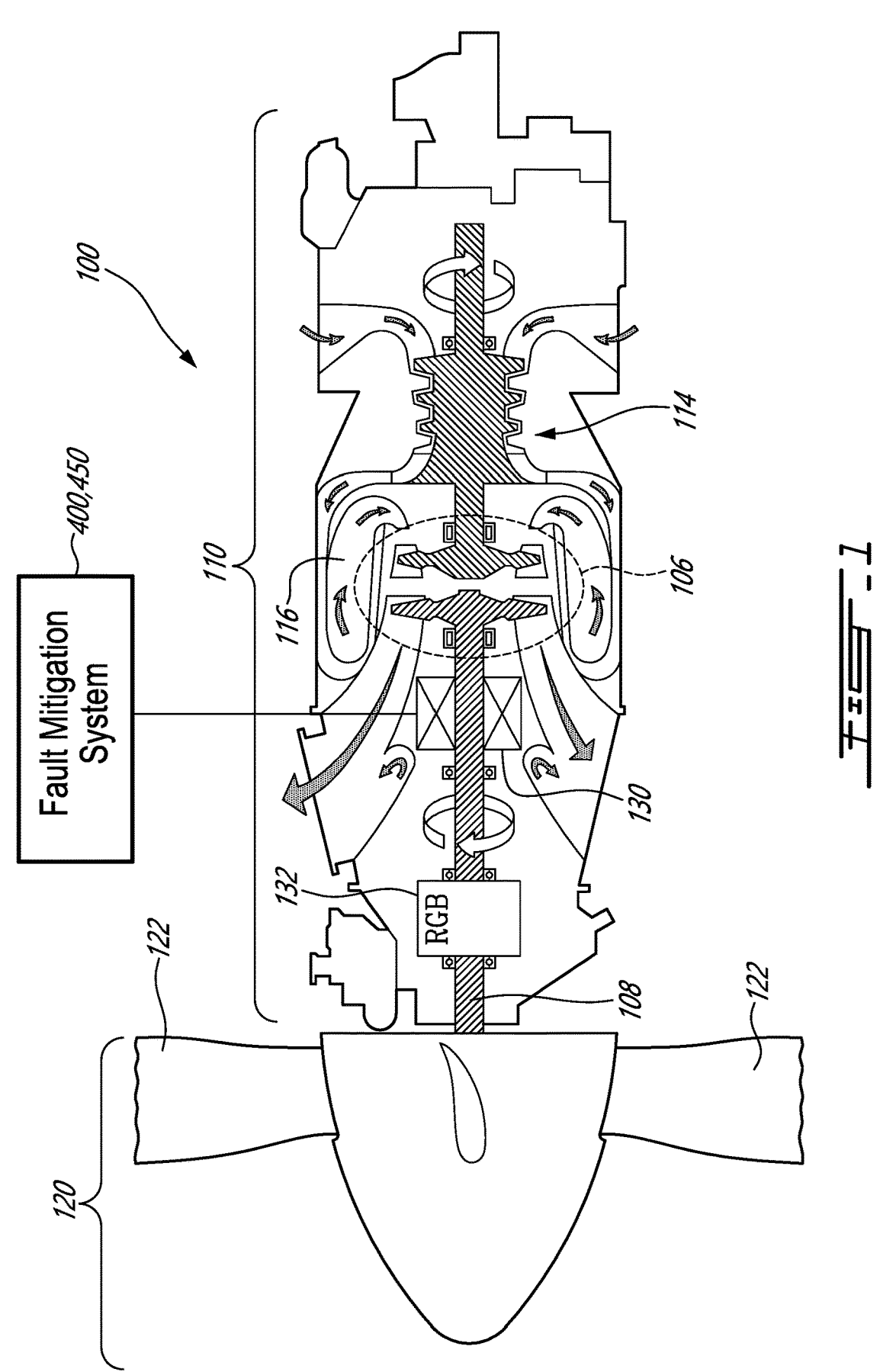
FIG. 1 is a schematic cross-sectional view of an exemplary hybrid electric power plant including a fault mitigation system as described herein.

An example HEP 100 is shown in FIG. 1 and generally comprises a thermal engine 110, an electric motor 130 and a propeller 120. The thermal engine 110 is, in this example, a combustion engine, and more particularly a turboprop gas turbine engine. Other types of internal combustion engines, such as gas turbine (e.g., turboshaft, turbofan) engines, piston engines and rotary engines, may also be suitable. Generally, the thermal engine 110 may be any system that converts heat or thermal energy to mechanical energy which can then be used to drive a load, such as the propeller 120. In various embodiments, the load may be any suitable air mover for propelling a fixed-wing aircraft or a rotary wing aircraft. For example, the load may be a bladed rotor such as a propeller, a fan, a helicopter main rotor and/or a helicopter tail rotor. The electric motor 130 may be any suitable type of electric motor, including an electric machine that may be driven as a motor and as a generator.

The propeller 120 may be attached to (i.e., in torque-transmitting engagement with) a shaft 108 and driven by one or more turbines of the turbine section 106 via the shaft 108. There is provided in serial flow communication a compressor section 114 for pressurizing ambient air, a combustor 116 in which the compressed air is mixed with fuel and ignited for generating an annular stream of hot combustion gases, and a turbine section 106 for extracting energy from the combustion gases driving the rotation of the propeller 120 through the shaft 108. The propeller 120 converts rotary motion from the shaft 108 of the thermal engine 110 to provide propulsive force (e.g., thrust) for the aircraft. The propeller 120 may be a variable-pitch propeller capable of generating forward and reverse thrust and may comprise two or more propeller blades 122. For a propeller-driven aircraft propulsion system, the thermal engine 110 may drive the propeller 120 via a (e.g., speed-reducing) gear box (RGB) 132.

In some embodiments, the electric motor 130 may also be configured to drive the propeller 120 via RGB 132 and the shaft 108. The electric motor 130 may convert electricity to motive power that is in turn converted to thrust by the propeller 120. The HEP 100 thus includes two motive power sources, namely the electric motor 130 and the thermal engine 110, whose power may be combined (e.g., through the RGB 132) and used to drive the load (e.g., propeller 120). While the thermal engine 110 and the electric motor 130 are shown in this example to be coupled to the propeller 120 through the RGB 132, other configurations are also contemplated. For example, in other configurations, a power plant having a thermal engine and an electric motor may be coupled to one or more loads without a gear box.

Referring to FIG. 2, a power management system 200 is coupled to the HEP 100, which includes the thermal engine 110, electric motor 130, and a combining gearbox 232 (which can also provide the mechanical speed reduction typically provided by the reduction gearbox 132). A total power request is received, for example from a power lever 202 (also known as "throttle lever") in an aircraft cockpit, at the power management system 200. The position of power lever 202 may provide a power lever angle (PLA) representative of the total power request. In some embodiments, the total power request may come from another aircraft or avionic system, or from an engine system or controller. For example, the total power request may be sent from the power lever 202 to another system which may then provide the information to the power management system 200. The power management system 200 may convert the total power request into an electric power request and a thermal power request in accordance with a desired proportion of electric power and thermal power. The electric power request and the thermal power request may then be converted into an electric power command and a thermal power command, respectively, which are used to drive the electric motor 130 and thermal engine 110, respectively. The breakdown between thermal power and electric power may vary anywhere between 0% to 100% for either power source. It will be appreciated that in embodiments which do not include a thermal engine 110, the total power request may be used as the electric power request without any conversion to proportions of thermal power and electric power.

Figure 5A:
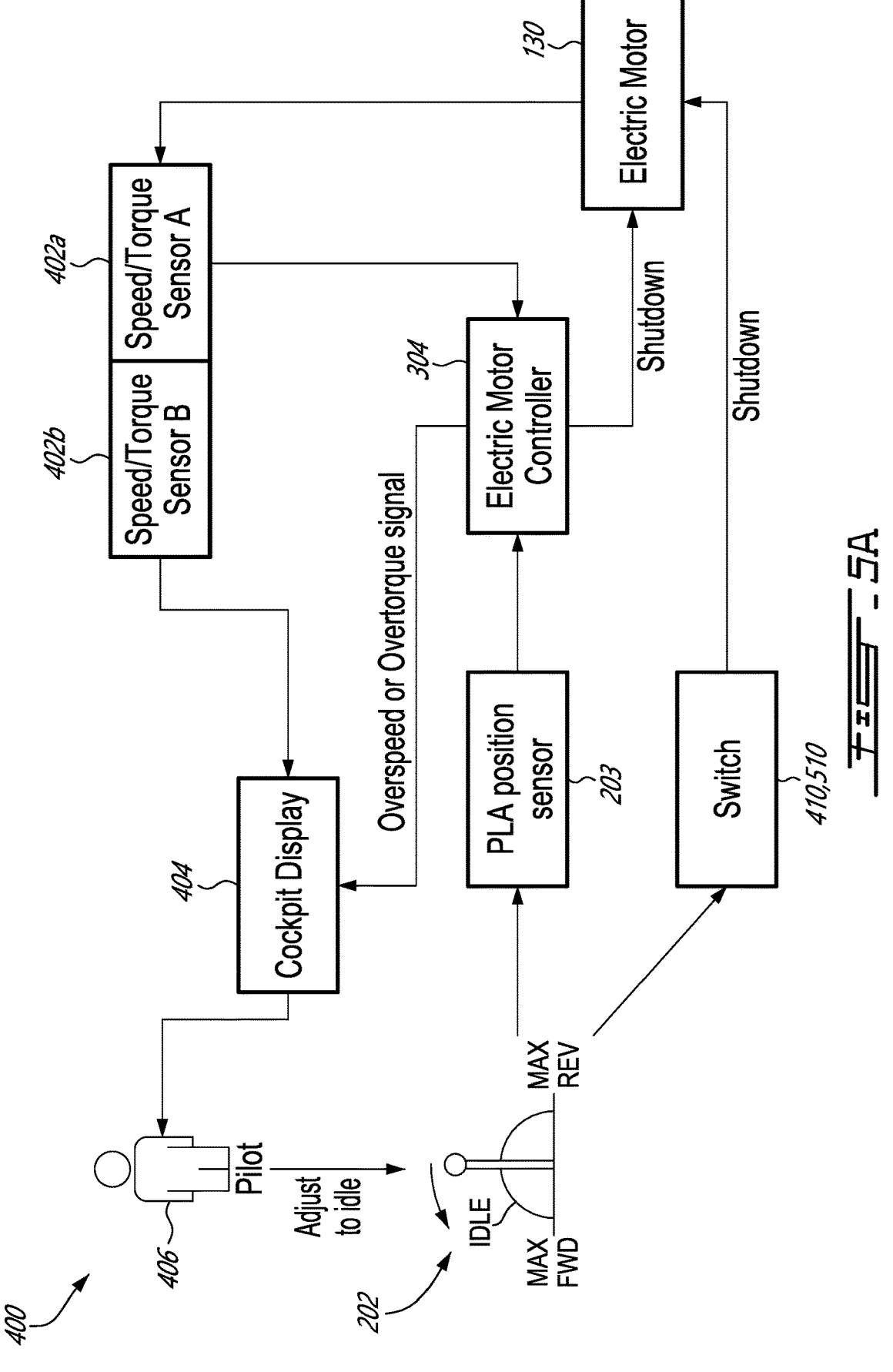
FIG. 5A is a schematic diagram of an exemplary fault mitigation system of the power plant of FIG. 1.

In some embodiments, two separate power lanes are provided from the power management system 200 to the HEP 100, one for the thermal power command and one for the electric power command, and are referred to herein as the thermal power lane and the electric power lane, respectively. The actual power output by the HEP 100 for each power source may be provided to the power management system 200 (e.g., by a torque and/or speed sensor, such as speed/torque sensor 402 as shown in FIG. 5A as power is the product of torque and angular velocity). The power management system 200 may be configured to detect faults that have the potential to affect the power command or power output to a given power lane by comparing a given power command to an actual output power. A fault in the electric power lane may be detected when the electric power output deviates from the electric power command by more than a first threshold. A fault in the thermal power lane may be detected when the thermal power output deviates by the thermal power command by more than a second threshold. The first and second thresholds may be the same or different, taking into account the differences between the thermal engine 110 and the electric motor 130. The fault may be confirmed using a timer, i.e. the deviation is maintained for a predetermined time (e.g., the fault meets a persistence criteria).

In some embodiments, the power management system 200 is implemented within a single controller 204. The controller 204 may be part of a multi channel or single channel arrangement, each channel having one or more processors, each processor having one or more cores. Various functions of the system 200 may be split across channels and/or processors and/or cores. For example, a first channel may convert the thermal power request to a thermal power command while a second channel may convert the electric power request to an electric power command. Similarly, a first processor or first core may convert the thermal power request to a thermal power command while a second processor or core may convert the electric power request to an electric power command. Fault detection and fault accommodation may be provided in a same or separate channel, processor, and/or core.

Figure 3:
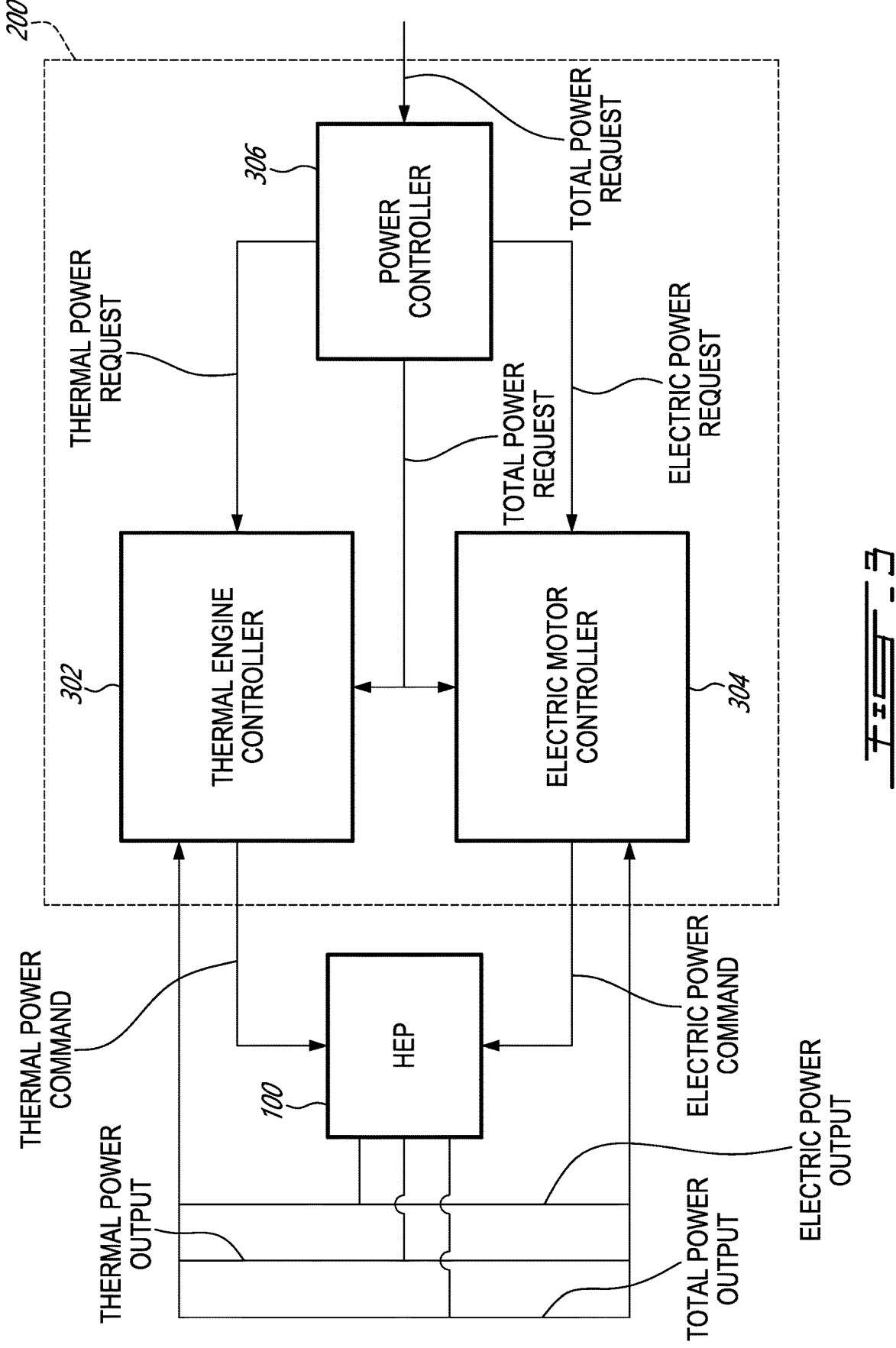
FIG. 3 is a schematic diagram of an exemplary embodiment of a power management system of FIG. 2.

FIG. 3 is a schematic diagram of an exemplary embodiment of the power management system 200. In some embodiments, the power management system 200 may include a first controller and a second controller, with each controller dedicated to one of the thermal engine 110 and the electric motor 130. A thermal engine controller 302 may receive the thermal power request and determine the thermal power command based on the thermal power request. In some embodiments, other parameters such as aircraft parameters, thermal engine parameters, and ambient operating conditions may be used to determine the thermal power command. Examples of aircraft parameters may include but are not limited to flight phase, aircraft weight, fuel status, battery state of charge, weight on wheels, flap setting, and secondary system requests (e.g. bleed system, hydraulic drive system, electrical power generation system). Examples of engine parameters may include but are not limited to temperature, rotational speed, pressure, fuel rate, output torque, and internal system operating conditions. Examples of ambient operating conditions may include but are not limited to outside air temperature, altitude, Mach number, calibrated air speed, and ambient pressure. An motor controller 304 may receive the electric power request and may determine the electric power command based on the electric power request. In some embodiments, other parameters such as the aircraft parameters, electric motor parameters, and the ambient operating conditions may be used to determine the thermal power command. Examples of the electric motor parameters may include but are not limited to voltage, current, torque, speed, power factor, efficiency, internal temperature, and internal resistance.

In some embodiments, a third controller may be provided in the power management system 200 for converting the total power request into the thermal power request and the electric power request. For example, a power controller 306 may be found upstream of the thermal engine controller 302 and the motor controller 304 to perform this function. Alternatively, the power controller 306 may form part of the thermal engine controller 302 or the motor controller 304 instead of being provided separately therefrom.

Fault detection may be performed by comparing an actual power output to a corresponding power command for a given power source. In some embodiments, each controller 302, 304 may be configured to perform fault detection for its own power lane in a form of self-diagnosis. For example, the motor controller 304 may receive the electric power output from the HEP 100 and compare the electric power output to its own electric power command to detect a fault. Upon detection of a fault (e.g. an overspeed or overtorque condition, in which the output power of electric motor 130 exceeds the electric power command), the motor controller 304 may send a fault flag which may be converted to a (e.g., visual and/or aural) notification to the pilot of the aircraft (e.g. as a warning signal in the cockpit of the aircraft). This warning signal may be perceived by the pilot, who may then mitigate the fault or failure by moving the power lever 202 to the idle (off) position (as shown in FIG. 2) in order to reduce the speed and torque of electric motor 130 to zero. When the power lever 202 is in the idle position, motor controller 304 will receive a signal from the PLA position sensor 203 (shown in FIG. 5B) and generate an electric power command to set the electric motor 130 torque to zero.

A potential problem underlying power management system 200 is that in the event of the fault associated with the electric motor 130 being a failure in the motor controller 304, PLA position sensor 203 or other part of the electric power lane, the zero torque command generated via the PLA sensor 203 may not be effective due to the fault. If the motor controller 304 or associated control electronics are malfunctioning, the total power request from power lever 202 might not get converted to the corresponding electric power command correctly. In addition, if motor controller 304 is malfunctioning, the electric power command might not be transferred to electric motor 130. Thus, it is possible that the zero torque command set by the pilot via power lever 202 in response to a detected overspeed or overtorque condition might not be delivered to the electric motor 130, which could result in the overspeed or overtorque condition persisting. In some embodiments, the systems and methods described herein may allow for electric motor 130 to be deactivated (e.g., stopped, shut down) without relying on a single communication path. For example, the systems and methods described herein may rely on a separate communication path (e.g., independent of motor controller 304 and/or of PLA position sensor 203) for deactivating electric motor 130.

Figure 4:
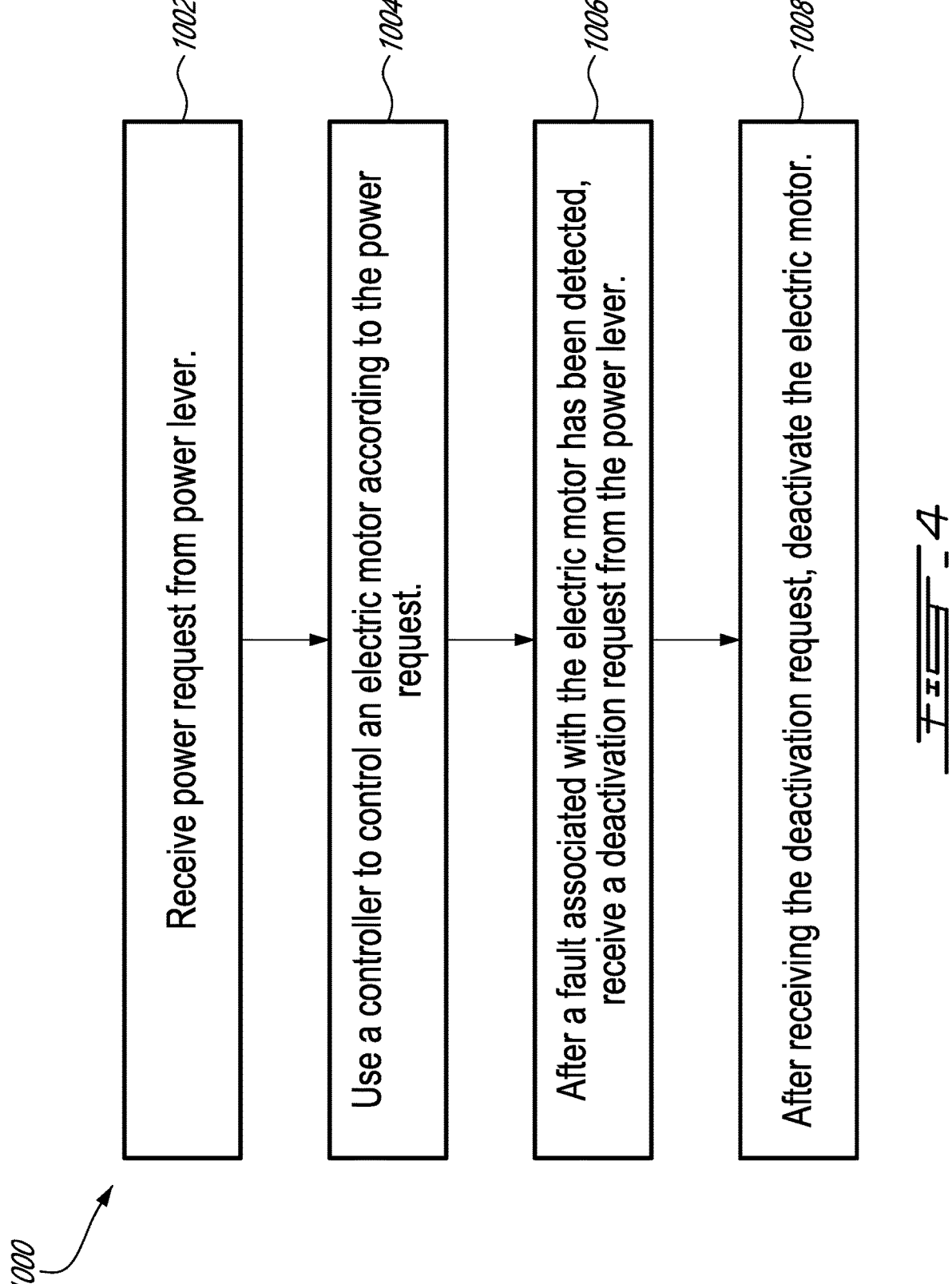
FIG. 4 is a flow diagram of a method of operating an aircraft power plant including an electric motor.

FIG. 4 is a flow diagram of method 1000 of operating an aircraft power plant such as HEP 100 including electric motor 130. Method 1000 may be carried out using fault mitigation system 400 described below or using other system. Method 1000 may include elements of fault mitigation system 400, 450 and/or other actions disclosed herein. In various embodiments, method 1000 may include:

receiving a (e.g., total or electric) power request from power lever 202 of the aircraft (block 1002);

using controller 304 or 304*a* (shown in FIG. 5B) to control electric motor 130 according to the power request (block 1004);

after a fault associated with electric motor 130 has been detected, receiving a deactivation request from power lever 202 (block 1006); and after receiving the deactivation request, deactivating electric motor 130 (e.g., independently of controller 304 or 304*a*) (block 1008).

In some embodiments of method 1000, controlling electric motor 130 according to the power request may be carried out via a first communication path between power lever 202 and electric motor 130. In some embodiments of method 1000, the electric motor 130 may be deactivated via a second communication path between power lever 202 and electric motor 130. The second communication path being separate from the first communication path. In some embodiments, the second communication path may exclude the first communication path. In some embodiments, the second communication path may exclude one or more elements of the first communication path. In some embodiments, the second communication path may exclude controller 304 or 304*a*. In some embodiments, the second communication path may be independent of the first communication path so that a failure along the first communication path may still permit electric motor 130 to be deactivated via the second communication path.

Aspects of method 1000 are described below in relation to the subsequent figures.

FIG. 5A is a schematic diagram of an exemplary fault mitigation system 400, in accordance with some embodiments. During normal operation, the position (e.g., PLA) of power lever 202 will be detected by a sensor (e.g., PLA sensor 203), which may convert the PLA to a signal in the form of a power request received at motor controller 304. Motor controller 304 may then convert the PLA to a corresponding power command used to control electric motor 130.

As depicted, the output power of electric motor 130 may be measured by one or more speed and/or torque sensors 402. In the example embodiment depicted in FIG. 5A, system 400 includes two sensors, namely speed/torque sensor A 402*a* and speed/torque sensor B 402*b*. Electric motor 130 power output signals may be transmitted from speed/torque sensor 402*a* to motor controller 304. In some embodiments, electric power output signal may be transmitted to a display 404 in the cockpit of the aircraft (e.g., to provide a visual indication of the current electric power output to pilot 406). Motor controller 304 may be configured to compare the electric power output to the electric power command that motor controller 304 is using to drive electric motor 130. Speed/torque sensor A 402*a* may provide feedback to motor controller 304 to permit closed loop control of electric motor 130.

When the power output from electric motor 130 is greater than or is different from the expected output power (e.g., by more than a threshold amount, for longer than a predetermined period of time), motor controller 304 may determine that a fault (e.g., overspeed or overtorque condition) is associated with electric motor 130, and may cause a warning to be delivered to pilot 406 via cockpit display 404. Alternatively or in addition, speed/torque sensor B 402*b* may provide torque and/or speed feedback to pilot 406 via cockpit display 404 (e.g., directly) without electric motor controller 304 as an intermediary. Pilot 406 may then determine whether the fault (e.g., overspeed or overtorque condition) exists based on the feedback provided via cockpit display 404.

In some embodiments, in response to receiving the overspeed/overtorque warning signal on cockpit display 404 in the cockpit of the aircraft, the pilot 406 may adjust the position of power lever 202 to an idle (off) position. As depicted, power lever 202 includes a switch 410 or switch 510 which is (e.g., directly) operatively connected to an electrical power input electric motor 130 via a communication path that excludes motor controller 304. Switch 410, 510 may be used to generate the deactivation request.

In some embodiments, switch 410, 510 is positioned on power lever 202 or otherwise associated with power lever 202 so as to be easily accessible and/or actuatable by pilot 406. In some embodiments, activation of switch 410, 510 will disconnect electrical power from electric motor 130, thereby resulting in de-powering electric motor 130. In other words, switch 410, 510 may be operated as a "kill" switch for electric motor 130.

In some embodiments, switch 410, 510 may be a microswitch. That is, switch 410, 510 may require relatively little amount of force to be actuated. Thus, pilot 406 may quickly and easily actuate switch 410, 510 in the event of a detected fault to quickly deactivate (e.g., de-power) electric motor 130, and activate a direct shutdown path for electric motor 130 without motor controller 304 as a possible point of failure in the de-powering mechanism. In some embodiments, switch 410, 510 may act as a relay between an electric power input to electric motor 130 and a power source for powering electric motor 130.

In some embodiments, switch 410, 510 may provide a method of de-powering electric motor 130 which is independent from the operation of motor controller 304. Thus, in the event that motor controller 304 is malfunctioning and preventing the adjustment of power lever 202 to the idle position from resulting in shutting down electric motor 130, pilot 406 may have an alternative communication path for disabling electric motor 130. Moreover, in some embodiments, actuating switch 410, 510 may result in the electric motor 130 being powered down in a shorter amount of time than via motor controller 304, as the use of switch 410, 510 may avoid the signal processing time required to convert the PLA into a command for electric motor 130 by motor controller 304.

In HEP 100, the positioning of switch 410, 510 on or in the vicinity of the power lever 202 may allow for a deactivation request to be transmitted directly to electric motor 130, and the position of power lever 202 may still be utilized by power controller 306 and thermal engine controller 302 to control thermal engine 110. In some embodiments, power controller 306 may be configured to adjust the thermal power command based on, for example, whether switch 410, 510 has been actuated or power lever 202 is in the designated throttle position for deactivating electric motor 130. For example, power controller 306 may increase the thermal power command to compensate for a loss of electric power when electric motor 130 is shut down. In some embodiments, power controller 306 may be configured to shut down thermal engine 110 when switch 410, 510 has been actuated (e.g., by cutting the fuel supply to thermal engine 110).

Figure 5B:
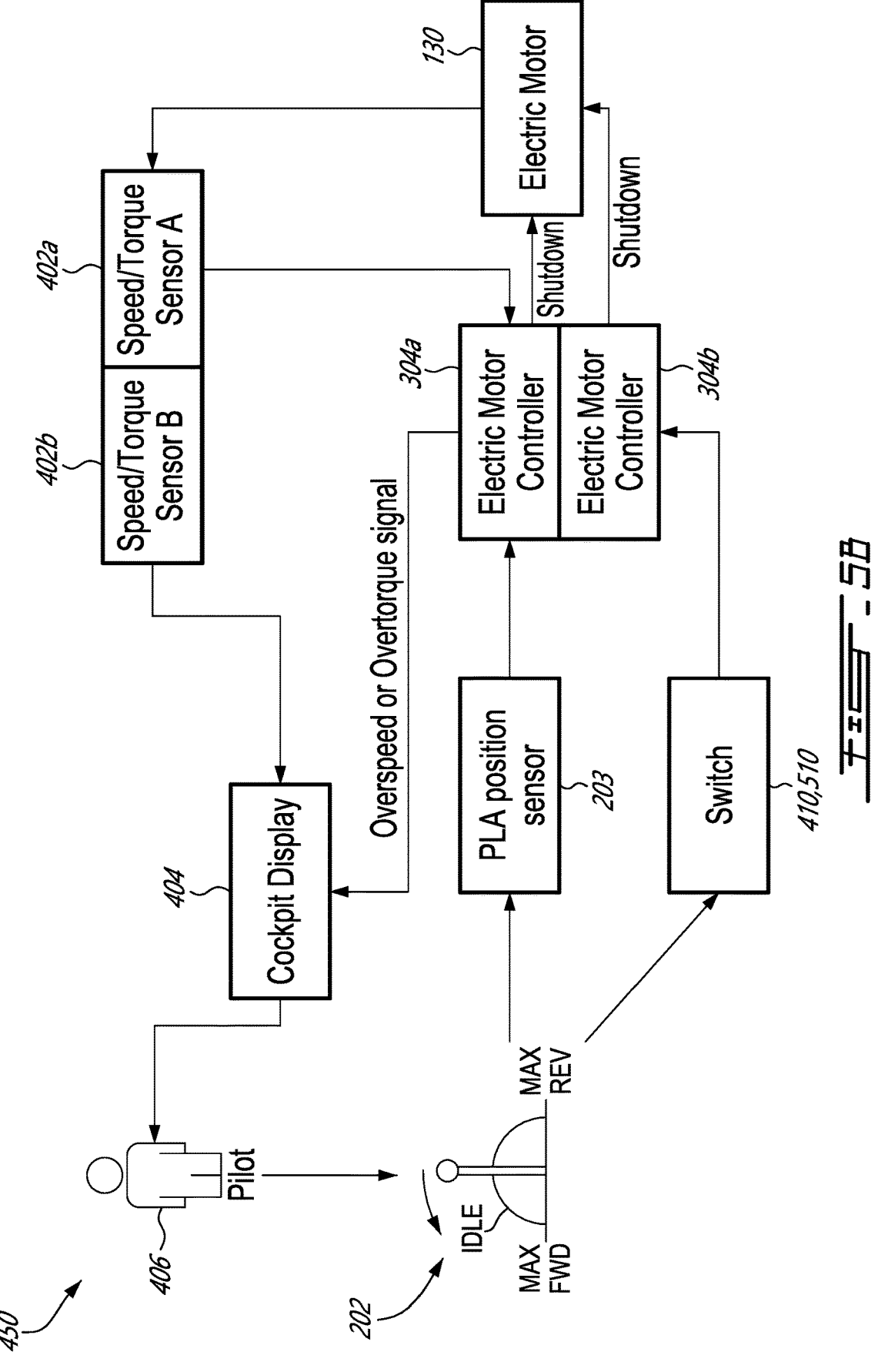
FIG. 5B is a schematic diagram of another exemplary fault mitigation system of the power plant of FIG. 1.

FIG. 5B is another schematic diagram of an exemplary fault mitigation system 450, in accordance with some embodiments. System 450 includes components similar to system 400, and incorporates a dual-channel electric motor controller architecture (depicted as motor controller 304*a* and motor controller 304*b* in FIG. 5B). As depicted, certain aspects of system 450 function in a similar manner to those of system 400. For example, speed/torque sensor A 402*a* and speed/torque sensor B 402*b* may detect the electric output power from electric motor 130 and transmit a power output signal to cockpit display 404 in the cockpit of the aircraft and transmit feedback on the operation of electric motor 130 to motor controller 304*a*.

When the electric power output is greater than or different from the expected electric power output (e.g., by more than a threshold amount, for longer than a predetermined threshold time period), motor controller 304*a* may determine that electric motor 130 is in a fault (e.g., overspeed or overtorque) condition, and cause a warning to be delivered to pilot 406 via cockpit display 404 in the cockpit of the aircraft. Alternatively or in addition, speed/torque sensor B 402*b* may provide torque and/or speed feedback to pilot 406 via cockpit display 404 (e.g., directly) without electric motor controller 304*a* as an intermediary. Pilot 406 may then determine whether the fault (e.g., overspeed or overtorque condition) exists based on the feedback provided via cockpit display 404.

In some embodiments, in response to receiving the overspeed/overtorque warning signal on cockpit display 404 in the cockpit of the aircraft, the pilot 406 may adjust the position of power lever 202 to an idle (off) position. A switch 410, 510 may be associated power lever 202 may be operatively connected to motor controller 304*b*. In some embodiments, motor controller 304*b* may be a separate controller from motor controller 304*b* and may serve as a separate channel functioning independently of motor controller 304*a*.

In some embodiments, movement of power lever 202 to the idle position (or any other predetermined PLA) may trigger the actuation of switch 410, 510, or switch 410, 510 may be separately manually actuated by pilot 406 so that the actuation of switch 410, 510 is not caused by movement of power lever 202. Actuation of switch 410, 510 may transmit a deactivation request to motor controller 304*b*, which may then, in response to receiving the deactivation request, de-power electric motor 130. Thus, by using independent channels of a dual-channel control configuration, the signal from switch 410, 510 may be routed via a fully independent communication path to de-power and shut down electric motor 130. As such, system 450 may also not have a single point of failure for shutting down electric motor 130. For example, in the event that motor controller 304*a* were to fail, and motor controller 304*b* may still function to shut down electric motor 130.

The complexity of software-based systems, particularly those forming part of an aircraft fault detection and/or mitigation system, makes it difficult for such systems to have a high reliability level. In some embodiments, systems 400, 450 may allow electric motor overspeed/overtorque conditions to be quickly detected and mitigated while respecting industry standards and guidelines for airborne electronic hardware. For example, the current industry standard for the development of aircraft systems taking into account the overall aircraft operating environment and functions may be found in Aerospace Recommended Practice (ARP) ARP4754A (Guidelines For Development Of Civil Aircraft and Systems) from SAE International. ARP4754A describes the design assurance concept for application at the aircraft and system level and standardizes the term "development assurance". Another document, Radio Technical Commission for Aeronautics (RTCA) RTCA DO-254 (Design Assurance Guidance for Airborne Electronic Hardware) published by RTCA Incorporated provides guidance for the development of airborne electronic hardware and has been recognized by the Federal Aviation Administration (FAA) as a means of compliance for the development assurance of electronic hardware in airborne systems. There are five levels of compliance, Development Assurance Levels (DAL) A through E, which depend on the effect a failure of the hardware will have on the operation of the aircraft. DAL A is the most stringent, defined as a "catastrophic" effect, while a DAL E will not affect the safety of the aircraft. Meeting DAL A compliance for complex electronic hardware requires a much higher level of verification and validation than a DAL E compliance. Most avionic platforms are DAL B or DAL C and may not be suitable for mitigating a fault such as an overspeed or overtorque condition in electric motor 130. It may be desirable or required to have such fault mitigation meet DAL A.

Systems 400, 450 for mitigating electric motor faults are provided with architectures that have two independent, segregated ways of deactivating electric motor 130, so as to meet industry regulations such as RTCA DO-254. Critical electric motor 130 control functions may be performed by components having a critical, or highest, level of reliability and non-critical electric motor control functions may be performed by components having a non-critical level of reliability. For the purposes of the present disclosure, a component is deemed to have a critical level of reliability if a comprehensive combination of deterministic tests and analyses can ensure correct functional performance under all foreseeable operating conditions with no anomalous behavior. Conversely, a component that cannot have a correct functional performance ensured by tests and analyses alone cannot be assigned a critical level of reliability and is therefore deemed to have a non-critical level of reliability. There may be multiple levels of non-criticality.

The critical electric motor 130 functions may comprise cutting electrical power to electric motor 130, and may be performed with components having a critical level of reliability, which is equivalent to DAL A for RTCA DO-254. Deactivating electric motor 130 may be performed via switch 410, 510. In some embodiments, components such as switch 410, 510 having a critical level of reliability may be non-complex electronic hardware components. This may include deterministic (or binary) logic components, such as Boolean gates, non-complex hardware switches and commercial off-the-shelf (COTS) components. Firmware, which is understood as a specific class of software that provides low-level control for a device's specific hardware, may also fall into the category of non-complex electric hardware components.

Various architectures are contemplated for the failure mitigation system 400, 450, including having a direct communication path between switch 410, 510 and electric motor 130, and as part of a dual-channel configuration including motor controllers 304*a*, 304*b* having independent and redundant paths for deactivating (e.g., shutting down) electric motor 130.

FIG. 6A is a schematic diagram of an exemplary switch 410 that may be incorporated in fault mitigation system 400 or in fault mitigation system 450. Switch 410 may be disposed on a handle of power lever 202 or on another part of power lever 202 and may be manually actuatable by pilot 406 independently of the positional setting of power lever 202. Switch 410 may be disposed at a convenient location that is readily accessible by pilot 406. In some embodiments, switch 410 may be actuatable via a (e.g., spring loaded) push button disposed on power lever 202. For example, depressing the push button may electrically connect terminals 420, 422 together, which may be part of a relay switch configuration where the application of (e.g., low) direct-current (DC) voltage LV may cause the opening of contactor 424, which may be normally closed during normal operation of electric motor 130. The opening of contactor 424 may cause (e.g., high-voltage) battery 426 to become disconnected from inverter 428 and hence from electric motor 130. The actuation of switch 410 may be considered a deactivation request for deactivating electric motor 130. The deactivation request may be used to open contactor 424 or to instruct motor controller 304b to deactivate electric motor 130. The communication path between switch 410 and contactor 424 (or between switch 410 and motor controller 304b) may exclude controller 304 or 304a.

FIG. 6B is a schematic diagram of an exemplary switch 510 that may be incorporated in fault mitigation system 400 or fault mitigation system 450. Switch 510 may be actuatable from the movement (e.g., rotation) of power lever 202 to a prescribed PLA (e.g., idle or other position) of power lever 202. For example, the movement of power lever 202 to the idle position may electrically connect terminals 420, 422 together, which may be part of a relay switch configuration as shown in FIG. 6A to cause opening of contactor 424. The movement of power lever 202 away from the idle position may electrically disconnect terminals 420, 422. The deactivation request from switch 510 may be used to open contactor 424 or to instruct motor controller 304b to deactivate electric motor 130 by causing electric motor 130 to output zero torque (i.e., motor controller 304b executing a zero torque command). The communication path between switch 510 and contactor 424 or between switch 510 and motor controller 304b may exclude controller 304a.

Figure 7:
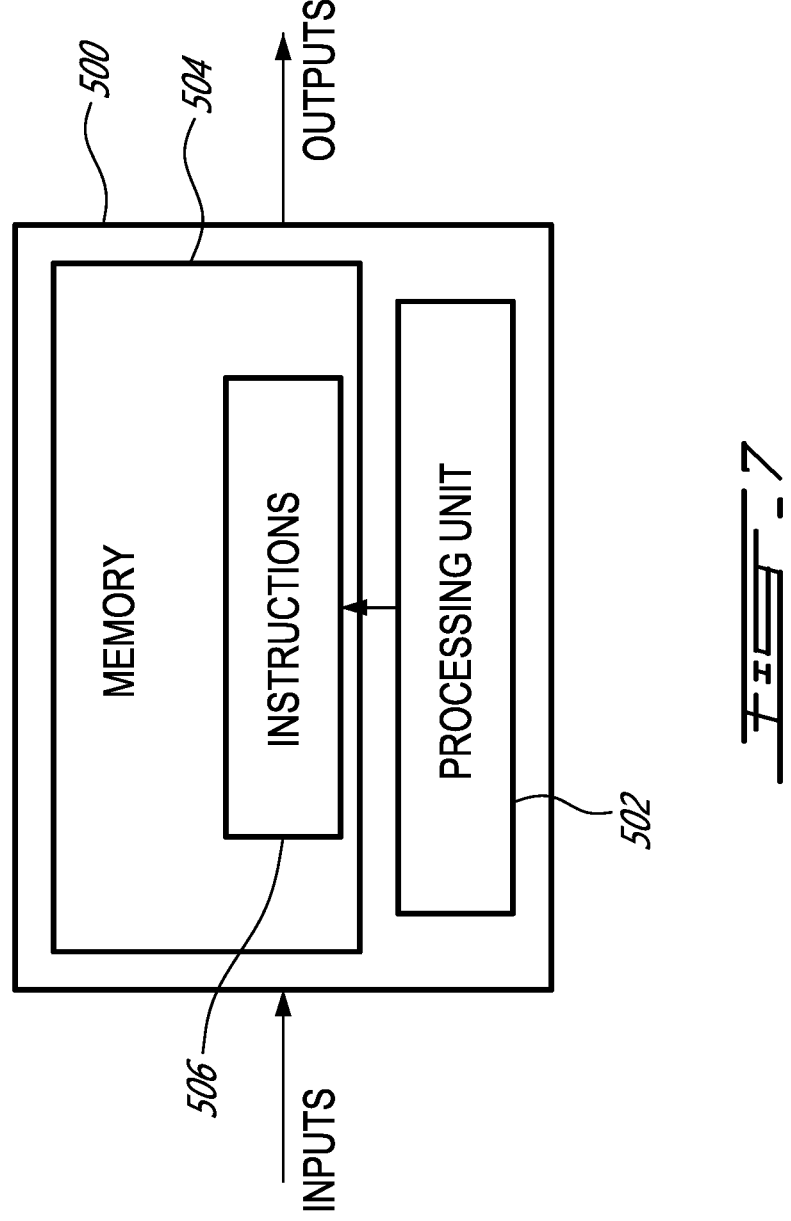
FIG. 7 is a block diagram of an exemplary controller of the power plant of FIG. 1.

The power management system 200 and/or fault mitigation system 400 may be implemented with one or more computing devices 500, an example of which is illustrated in FIG. 7. For simplicity, only one computing device 500 is shown but, for example, each controller 302, 304a, 304b, 306 may be implemented by one or more of the computing devices 500. The computing devices 500 may be the same or different types of devices. Note that the thermal engine controller 302 and/or power controller 306 may be implemented as part of a full-authority digital engine controls (FADEC) or other similar device, including electronic engine control (EEC), engine control unit (ECU), electronic propeller control, propeller control unit, and the like. The motor controller 304 may be implemented as part of a motor controller (MC), electric motor controller (EMC), electric powertrain controller (EPC), and the like. Other embodiments may also apply.

The computing device 500 may comprise a processing unit 502 and a memory 504 which has stored therein computer-executable instructions 506. The processing unit 502 may comprise any suitable devices configured to implement the method 1000 such that instructions 506, when executed by the computing device 500 or other programmable apparatus, may cause the functions/acts/steps performed as part of the method 1000 as described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

The methods and systems for fault mitigation of an aircraft power plant described herein may be implemented in a high level procedural or object oriented programming or scripting language, or a combination thereof, to communicate with or assist in the operation of a computer system, for example the computing device 500. Alternatively, the methods and systems for fault mitigation may be implemented in assembly or machine language. The language may be a compiled or interpreted language. Program code for implementing the methods and systems for fault mitigation may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for fault mitigation may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein, for example those described in the method 1000.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of operating an aircraft power plant including an electric motor configured to propel an aircraft, the method comprising:

receiving a power request from a power lever of the aircraft;

using a controller to control the electric motor according to the power request;

after a fault associated with the electric motor has been detected, receiving a deactivation request to deactivate the electric motor in response to the power lever being positioned in an idle position; and after receiving the deactivation request, deactivating the electric motor independently of the controller.

2. The method of claim 1, wherein generating the deactivation request includes actuating a switch from movement of the power lever to the idle position.

3. The method of claim 1, wherein the deactivating of the electric motor comprises disconnecting the electric motor from a power source configured to power the electric motor.

4. The method of claim 1, wherein: the controller is a first controller for the electric motor; and the method further includes: receiving the deactivation request at a second controller for the electric motor; and using the second controller to deactivate the electric motor.

5. The method of claim 4, wherein the deactivation request is indicative of a request for zero output torque from the electric motor.

6. The method of claim 1, further comprising deactivating the electric motor via a communication path that excludes the controller.

7. The method of claim 1, further comprising:

using a first communication path between the power lever and the electric motor to control the electric motor according to the power request, the first communication path including the controller; and using a second communication path between the power lever and the electric motor to deactivate the electric motor, the second communication path being separate from the first communication path.

8. The method of claim 1, wherein: the aircraft power plant further includes a thermal engine configured to propel the aircraft; and the method includes controlling the thermal engine according to the power request.

9. A method of operating an aircraft power plant including an electric motor to propel an aircraft, the method comprising:

receiving a power request from a power lever of the aircraft;

controlling the electric motor according to the power request via a first communication path between the power lever and the electric motor;

after a fault associated with the electric motor has been detected, receiving a deactivation request to deactivate the electric motor in response to the power lever being positioned in an idle position; and deactivating the electric motor via a second communication path between the power lever and the electric motor, the second communication path being separate from the first communication path.

10. The method of claim 9, wherein:

the first communication path includes a motor controller; and the second communication path excludes the motor controller.

11. The method of claim 9, wherein:

the first communication path includes a first motor controller; and the second communication path includes a second motor controller.

12. The method of claim 9, wherein: the power aircraft plant further includes a thermal engine to propel the aircraft; and the method further includes controlling the thermal engine according to the power request.

13. A system for operating an aircraft power plant including an electric motor configured to propel an aircraft, the system comprising:

a power lever actuated by a pilot of the aircraft to generate a power request corresponding to a position of the power lever;

a controller operatively connected to the power lever and configured to control the electric motor according to the power request; and a switch actuated by movement of the power lever to an idle position, the switch being actuated to generate a deactivation request to deactivate the electric motor independently of the controller when the power lever is positioned at the idle position.

14. The system of claim 13, comprising a contactor configured to disconnect the electric motor from a power source configured to power the electric motor, the switch being operatively connected to the contactor via a communication path that excludes the controller.

15. The system of claim 13, wherein:

the controller is a first controller for the electric motor; and the system includes a second controller for the electric motor configured to receive the deactivation request and deactivate the electric motor.

* * * * *